(12) United States Patent
Dolev et al.

(10) Patent No.: US 9,008,311 B2
(45) Date of Patent: Apr. 14, 2015

(54) METHOD FOR ENCRYPTION AND DECRYPTION OF MESSAGES

(75) Inventors: Shlomi Dolev, Omer (IL); Ephraim Korach, Meitar (IL); Galit Uzan, Marseilles (FR)

(73) Assignee: Ben-Gurion University of the Negev Research and Development Authority, Beer Sheva (IL)

( * ) Notice: Subject to any disclaimer, the term of this patent is extended or adjusted under 35 U.S.C. 154(b) by 2142 days.

(21) Appl. No.: 11/630,783

(22) PCT Filed: Jun. 23, 2005

(86) PCT No.: PCT/IL2005/000669
§ 371 (c)(1),
(2), (4) Date: Jun. 23, 2009

(87) PCT Pub. No.: WO2006/001006
PCT Pub. Date: Jan. 5, 2006

(65) Prior Publication Data
US 2009/0296931 A1 Dec. 3, 2009

Related U.S. Application Data

(60) Provisional application No. 60/582,433, filed on Jun. 25, 2004.

(51) Int. Cl.
*H04L 29/06* (2006.01)
*H04L 9/08* (2006.01)

(52) U.S. Cl.
CPC ............ *H04L 9/0822* (2013.01); *H04L 9/0891* (2013.01)

(58) Field of Classification Search
CPC ............................ H04L 9/0891; H04L 9/0822
USPC .......... 380/1, 30, 47, 255, 262, 270; 713/150, 713/163
See application file for complete search history.

(56) References Cited

U.S. PATENT DOCUMENTS 5,768,388 A * 6/1998 Goldwasser et al. ........... 380/30
2002/0078364 A1 6/2002 Perkins et al.
(Continued)

OTHER PUBLICATIONS

M. Ajtai, "Generating Hard Instances of Lattice Problems", *Proc. of STOC*, pp. 99-108, 1996.
(Continued)

*Primary Examiner* — Justin T Darrow
(74) *Attorney, Agent, or Firm* — Browdy and Neimark, PLLC

(57) ABSTRACT

A communication system that includes a sender computer and plurality of designated receiver computers coupled to the sender through a communication link. Each one of the receiver computers is equipped with computational resources stronger than the computational resources of an adversary computer. There is provided a method for sending a secret from the sender computer to a designated receiver computer. The sender computer defining a succession of computational tasks having respective solutions. The computational tasks are so defined such that the duration of solving each task by the receiver computer is shorter than what would have been required for the adversary computer to solve the task. Next, the sender computer sending through the link the succession of tasks encrypted by previous solutions and the receiver computer receiving the tasks and is capable of decrypting the secret faster than what would have been required for the adversary computer to decrypt the secret.

23 Claims, 4 Drawing Sheets

(56) References Cited

U.S. PATENT DOCUMENTS

2003/0167314 A1* 9/2003 Gilbert et al. ............... 709/217
2004/0228479 A1* 11/2004 Crispin et al. ............... 380/28

OTHER PUBLICATIONS

M. Ajtai, "The Shortest Vector Problem in $L_2$ is NP-hard for Randomized Reductions (Extended Abstract)", *Proc. of the $30^{th}$ ACM STOC*, pp. 10-19, 1998.

M. Ajtai et al., "A Public-Key Cryptosystem with Worst-Case/Average-Case Equivalence (Extended Abstract)", *ECCC*, Report TR96-065, pp. 1-44, Nov. 8, 1996.

D. Boneh et al., "Timed Commitments (Extended Abstract)", *Proc. of Crypto'2000*, Santa Barbara, LCNS 1880, Springer Verlag, pp. 237-255, 2000.

Y. Z. Ding et al., "Hyper-Encryption and Everlasting Security", *STACS 2002*, pp. 1-26, 2002.

C. Dwork, "Positive Applications of Lattices to Cryptography", $22^{nd}$ *International Symposium on Mathematical Foundations of Computer Science*, LNCS 1295, Springer, pp. 44-51, 1997.

C. Dwork et al., "Pricing via Processing or Combatting Junk Mail", *CRYPTO '92*, LNCS 740, pp. 139-147, 1992.

A. K. Lenstra et al., "Analysis and Optimization of the TWINKLE Factoring Device", *EUROCRYPT 2000*, pp. 25-52, 2000.

W. Mao, "Timed-Release Cryptography", *Selected Areas in Cryptography*, pp. 342-358, 2001.

R. C. Merkel, "Secure Communications Over Insecure Channels", Merkle's Puzzles(7), *CACM*, vol. 21, No. 4, pp. 294-299, Apr. 1978.

U. M. Maurer, "Conditionally-Perfect Secrey and Provably-Secure Randomized Cipher", *Journal of Cryptology*, vol. 5, No. 1, pp. 53-66, 1992.

P. Q. Nguyen, "La Geometrie des Nombres en Cryptology", Ph.D. Thesis, Ecole Normale Superieure Universite Paris, 1999.

R. L. Rivest et al., "Time-lock puzzles and timed-release Crypto", Technical Report, *MIT/LCS/TR-684*, revised Mar. 10, 1996.

S. P. Vadhan, "On Constructing Locally Computable Extractors and Cryptosytems in the Bounded Storage Model", *CRYPTO '03*, Sep. 24, 2003.

A. J. Menezes, "Handbook of Applied Cryptography", pp. 118-120, 131, 300-3006, CRC Press LLC, 1997.

M. Agrawal et al., "PRIMES is in P", Dept. of Computer Science & Engineering, Indian Inst. of Tech Kanpur, India, http://www.cse.iitk.ac.in/users/manindra/primality.ps.2002.

A. Beimel et al., "Buses for Anonymous Message Deivery", *Journal of Cryptology*, vol. 16, pp. 25-39, 2003.

D. L. Applegate et al., "The Traveling Salesman Problem", Princeton Series in Applied Mathematics, Princeton University Press, 2006, http://www.tsp.gatech.edu.

T. Cormen et al., "Introduction to Algorithms", Chapter 6.5, pp. 118, MIT Press, 1990.

S. Dolev et al., "Magnifying Computing Gaps", Technical Reports #03-05, Ben Gurion University of Negev, Israel, Feb. 2003.

S. Dolev et al., "Magnifying Computing Gaps", Technical Reports #03-15 (revised version of #03-05), Ben Gurion University of the Negev, Israel, May 2003.

S. Dolev et al., "Xor-Trees for Efficient Anonymous Multicast and Reception", *ACM Transactions on Information and System Security*, vol. 3, No. 2, pp. 63-84, May 2000.

D. G. Feitelson, "Optical Computing: A Survey for Computer Scientists", MIT Press 1988, ISBN 0-262-06112-0 (HB).

J. W. Goodman, "Introduction to Fourier Optics", $2^{nd}$ Edition, McGraw-Hill International Editions (Singapore) 1996. ISBN 0-07-114257-6.

O. Goldreich et al. "A Hard-Core Predicate for all One-Way Functions", Proc. ACM Symp. on Theory of Computing, pp. 25-32, 1989.

D. S. Johnson et al., "Experimental Analysis of Heuristics for the ATSP", Draft (approx. final) of a chapter that appeared in "The Traveling Salesman Problem and its Variations", Gutin and Punnen (Editors), Kluwer Academic Publishers, Dordrecht, The Netherlands, pp. 455-487, 2002.

C. H. Papadimitrou, "Computational Complexity", Addison-Wesley Publishing Company, 1994, ISBN 0-201-53082-1.

J. H. Reif et al., "Efficient parallel algorithms for optical computing with the discrete Fourier transform (DFT) primitive", *Journal of Applied Optics*, vol. 36, No. 29, pp. 7327-7340, Oct. 10, 1997.

D. Applegate et al., "On the Solution of Traveling Salesman Problems", *Documenta Methematica*, Extra Volume ICM 1998-111, pp. 645-656.

D. Applegate et al., "Implementing the Dantzig-Fulkerson-Johnson algorithm for large traveling salesman problems", *Math. Program*, Ser. B, vol. 97, pp. 91-153, 2003.

Matthias Ehrgott, Approximation Algorithms for Combinatorial Multicriteria Optimization Problems, International Transactions in Operational Research, vol. 7, 2000, http://citeseerx.ist.psu.edu/viewdoc/download;jsessionid=29683C28DE245151243665B30E83A07D?doi=10.1.1.48.6662&rep=rep1&type=pdf.

Sharp-P, Wikipedia, the free encyclopedia, http://en.wikipedia.org/wiki/Sharp-P, Aug. 13, 2012.

Christos H. Papadimitriou, Computational Complexity, Aug. 1995 http://russell.lums.edu.pk/~archive/Complexity/Books/Computationalc%20Complexity%20-%20Papadimitriou/Computational%20Complexity%20-%20Papadimitriou.pdf.

Gupta and A. Warburton. Approximation methods for multiple criteria travelingsalesman problems, towards interactive and intelligent decision support systems.In Proceedings of 7th International Conference on Multiple Criteria Decision Making, pp. 211{217. Springer, 1986.

Moshe Dror, Gilbert Laporte, Francois V. Louveaux "Vehicle Routing with Stochastic Demands and Restricted Failures", vol. 37, No. 3 (1993), pp. 273-283, DOI: 10.1007/BF01415995, http://www.springerlink.com/content/x3682k0627124846.

Travelling salesman problem, Wikipedia, the free encyclopedia, http://en.wikipedia.org/wiki/Travelling_salesman_problem, Aug. 13, 2012.

Bodo Manthey "On Approximating Multi-Criteria TSP", Jul. 13, 2011, http://arxiv.org/pdf/0711.2157v3.pdf.

* cited by examiner

Program for Sender
1: Initialization
2: choose $n \geq 4$, $c_2 > 7 \cdot c_1$
3: such that $n \log n^{c_2} < c_1 n \log n \leq n^2$
4: $m := c_1 n \log n$
5: $q := n^{c_2}$
6: Send $(m, q)$
7: for $i := 1$ to $m - 1$
8: $\quad v_i := random(x_1, ..., x_n) \mod q$
9: $\quad \delta^{m-1} := random(\delta_1, ..., \delta_{m-1}) \mid \delta_i \in \{1, 0\}$
10: $v_m := -\Sigma(\delta_i \cdot v_i) \mod q$
11: for $i := 1$ to $m$ Send$(v_i)$
12: Repeat
13: $\lambda := (v_1, ..., v_m)$
14: OTP: =FindShortest$(\Lambda(\lambda, q))$
15: OTPS: =OTPS $\circ$ OTP
16: CipherText: =OTP $\oplus$ Secret
17: Send (CipherText)
18: for $i := 1$ to $m - 1$
19: $\quad v_i := random(x_1, ..., x_n) \mod q$
20: $\quad \delta^{m-1} := random(\delta_1, ..., \delta_{m-1}) \mid \delta_i \in \{1, 0\}$
21: $v_m := -\Sigma(\delta_i \cdot v_i) \mod q$
22: Send $((v_1, v_2, ..., v_m) \oplus$ psuffix(OTPS))
23: Until file transferred

Program for Receiver
1: Initialization
2: Recv $(m, q)$
3: Recv $(v_1, ..., v_m)$ 4: Repeat
5: $\lambda := (v_1, ..., v_m)$
6: OTP: =FindShortest$(\Lambda(\lambda, q))$
7: OTPS: =OTPS $\circ$ OTP
8: Recv(CipherText)
9: Secret: =CipherText $\oplus$ OTP
10: Recv $((v_1, v_2, ..., v_m) \oplus$ psuffix(OTPS))
11: Until file transferred Shortest 01 $\lambda$ $q$-Vector

FIG. 2

METHOD FOR ENCRYPTION AND DECRYPTION OF MESSAGES

FIELD OF THE INVENTION

The present invention is in the general field of encryption and decryption of data.

BACKGROUND OF THE INVENTION

Modern cryptography is based on complexity theory ensuring that the resources required to reveal a secret, computing time and/or space, are too large. One way functions are used in public key cryptography. However, public key schemes require two way communication—the sender computer should know in advance the public key of the receiver computer. One would like to encrypt a message without having any information concerning the recipients. In other words, one would like to have an encryption scheme that can be used preferably (although not necessarily) in a unidirected communication link. For example, a satellite that would like to broadcast a file with instructions (constituting the encrypted secret) to one or many on-ground computer units. The instructions should be decrypted only by the designated on ground unit(s) and not by any listening adversary computer.

There is a need in the art to provide for a new system and method that enhance the computation strength gap between the designated recipient computer and the adversary computer.

LIST OF RELATED ART

[1] M. Ajtai, "Generating Hard Instances of Lattice Problems" Proc. of STOC pp. 99-108, 1996.
[2] M. Ajtai, "The Shortest Vector Problem in L2 is NP-hard for Randomized Reductions", Proc. of the 30th ACM STOC, 1998.
[3] M. Ajtai, and C. Dwork, "Public-Key Cryposystem with Worst-Case/Average-Case Equivalence", Electronic Colloquium on Computational Complexity, Report TR96-065, 1996.
[4] D. Boneh, and M. Naor, "Timed Commitments", Proceedings of Crypto '2000, Santa Barbara, LNCS 1880, Springer Verlag, pp. 236-254, 2000.
[5] Y. Z. Ding and M. O. Rabin, "Hyper-Encryption and Everlasting Security", STACS 2002, pp. 1-26, 2002.
[6] C. Dwork, "Positive Applications of Lattice to Cryptography", Mathematical Foundations of Computer Science, pp. 44-51, 1997.
[7] C. Dwork and M. Naor, "Pricing via processing or combating junk mail", CRYPTO92, LNCS Vol. 740, pp. 139-147, 1992.
[8] A. K. Lenstra, A. Shamir, "Analysis and Optimization of the TWINKLE Factoring Device", EUROCRYPT 2000, pp. 35-52, 2000.
[9] W. Mao "Timed-Release Cryptography", Selected Areas in Cryptography, pp. 342-358, 2001.
[10] R. C. Merkel "Secure Communications Over Insecure Channels", CACM, Vol. 21, No. 4, pp. 294-299, April 1978.
[11] U. M. Maurer "Conditionaly-Perfect Secrecy and a Provable-Secure Randomized Cipher", Journal of Cryptology, Vol 5., No. 1, pp. 53-66, 1992.
[12] P. Q. Nguyen, La Geometrie des Nombres en Cryptologie, PhD Thesis, Ecole Normale Sup?rieure, Paris 1999.
[13] R. L. Rivest, A. Shamir, and D. A. Wagner, "Time-lock puzzles and time-release Crypto", Technical Report, MIT/LCS/TR-684.
[14] S. Vadhan, "On Constructing Locally Computable Extractors and Cryptosystems in Bounded-Storage Model", CRYPTO 2003.

SUMMARY OF THE INVENTION

In accordance with certain embodiments of the invention, there are provided at least one powerful receiving computer connected by a unidirectional communication link to a sender computer that should transfer a stream of information (constituting a secret) to the receiver computer in the presence of listening adversary computer that is weaker. In accordance with these embodiments, the computation strength gap of the powerful receiver computer(s) and the adversary computer(s) is enhanced. In other words, the gap between the amount of information decrypted by the adversary computer and the information decrypted by the receiving computer(s) grows with time.

The present invention provides a communication system that includes a sender computer and at least one designated receiver computer coupled to the sender through a communication link, each one of the receiver computers is equipped with computational resources stronger than computational resources of an adversary computer, a method for sending a secret from the sender computer to at least one of the designated receiver computers, comprising: a) the sender computer defining at least one computational task having respective solutions; the computational tasks are so defined such that the duration of solving at least one of the tasks by said designated computer is configured to be shorter than what would have been required for the adversary computer to solve the task; whereby an encrypted secret being a function of at least one solution of a task from among said tasks; b) the sender computer sending through the link at least one task; c) the receiver computer receiving said at least one task and is capable of decrypting said encrypted secret faster than what would have been required for the adversary computer to decrypt the secret.

Further provided by the present invention is a communication system that includes a sender computer and at least one designated receiver computer coupled to the sender through a communication link, each one of the receiver computers is equipped with computational resources stronger than computational resources of an adversary computer, a method for sending a secret from a sender computer to at least one of the designated receiver computers, comprising: a) the sender computer defining at least one computational task having a respective solution, whereby an encrypted secret being a finction of at least one of said solutions; b) the sender computer sending through the link at least one task; c) the receiver computer receiving said at least one task and is capable of solving said solutions and said decrypting said decrypted secret, such that the gap between the amount of information decrypted by the receiver computer by solving said solutions and the amount of information decrypted by the adversary computer by solving said solutions grows over time.

The present invention further provides a communication system that is configured to include a sender computer and at least one designated receiver computer connectable to the sender through a communication link, each one of the receiver computers is capable of being equipped with computational resources stronger than computational resources of an adversary computer, a method for sending a secret from the sender computer to at least one of the designated receiver computers, comprising: a) the sender computer defining at least one computational task having respective solutions; the computational tasks are so defined such that the duration of solving at least one of the tasks by said designated computer is configured to be shorter than what would have been required for the adversary computer to solve the task; whereby an encrypted secret being a function of at least one solution of a task from among said tasks; b) the sender computer sending through the link at least one task such that a receiver computer that is capable of receiving said at least one task is capable of decrypting said encrypted secret faster than what would have been required for the adversary computer to decrypt the secret.

The present invention further provides a communication system that is configured to include a sender computer and at least one designated receiver computer connectable to the sender through a communication link, each one of the receiver computers is capable of being equipped with computational resources stronger than computational resources of an adversary computer, a method for receiving a secret from the sender by a designated receiver computer, comprising:
a) the receiver computer receiving through said link at least one task; the at least one task is so defined to have respective solutions; b) the receiver computer is configured to solve at least one of the tasks in a shorter duration than what would have been required for the adversary computer to solve the task, whereby an encrypted secret being a function of at least one solution of a task from among said tasks; c) the receiver and is capable of decrypting said encrypted secret faster than what would have been required for the adversary computer to decrypt the secret.

Yet further provided by the present invention is a communication system that includes a sender computer and at least one designated receiver computer coupled to the sender through a communication link, each one of the receiver computers is equipped with computational resources, a method for sending a secret from the sender computer to at least one of the designated receiver computers, comprising: a) the sender computer defining at least one computational task having respective solutions; whereby the encrypted secret being a function of at least one solution of a task from among said tasks; b) the sender computer sending through the link at least one task;
c) the receiver computer receiving said at least one task and is capable of decrypting said encrypted secret; the decryption of the said encrypted secret depends on solving the said task.

BRIEF DESCRIPTION OF THE DRAWINGS

For a better understanding, the invention will now be described, by way of example only, with reference to the accompanying drawings, in which:

FIG. 2 illustrates a flow diagram of a sequence of operations in accordance with an embodiment of the invention;

Figure 1:
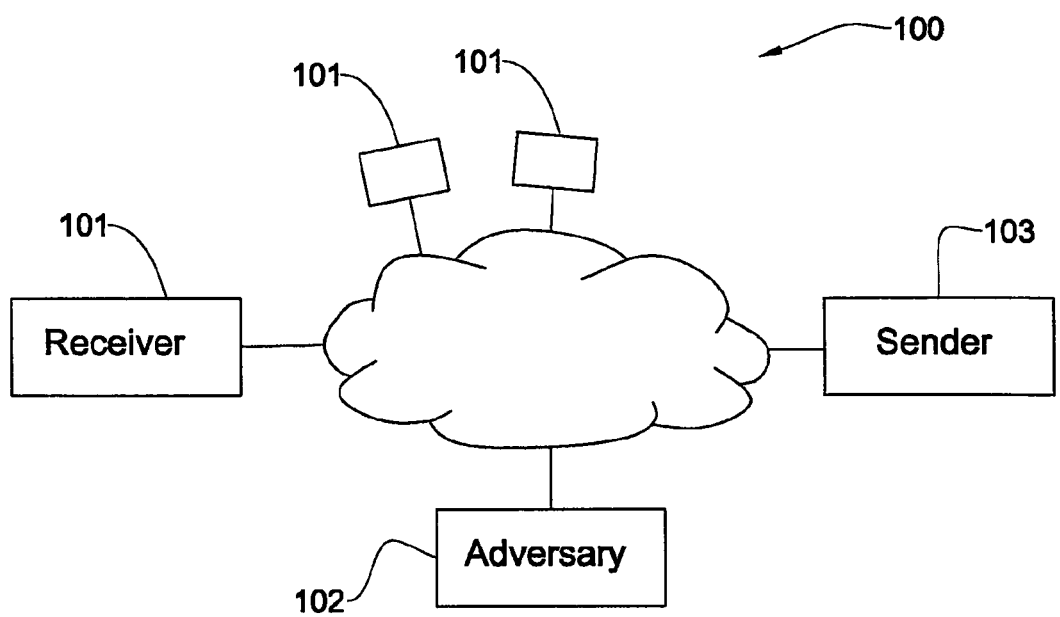
FIG. 1 illustrates a generalized block diagram of a system according to certain embodiments of the invention.

DETAILED DESCRIPTION OF SPECIFIC EMBODIMENTS:

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as, processor, computer, apparatus, system, sub-system, module, unit and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein, are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Note that in the context of the invention, the term secret refers to any desired information of interest, such as text data (in various forms) multimedia data of various kinds, etc.

It is assumed in the context of certain embodiments of the invention, that there is communication in one direction, from a sender computer to a receiver computer. The adversary computer can listen to the transmitted information along the transmission path. In accordance with certain other embodiments, the communication is bi-directional.

It is assumed in certain embodiments, that the sender and recipient have no pre-defined knowledge of the encryption/decryption keys, and that a listening adversary computer can reveal the secret if it has the same capabilities as the recipient computers, since it is assumed that the encryption protocol is known to all listener computers. Thus, in accordance with certain embodiments, to overcome the above limitation, it is possible to equip each receiver computer with a powerful resource that is able to compute, maybe only a specific problem, rapidly (see, e.g. [8]). This enhanced computational resources enhance the computational gap between the receiver computer and the adversary computer. Note that the computation gap encompasses gaps for instance: (i) in memory (as assumed in [11, 5, 14]), and/or (ii) in processing, and/or (iii) in communication. Any combination of such (or other) resources/capabilities that enforces computation gap is applicable. For example, one may consider a computer with a computing primitive that is capable to solve, for instance, a version of the multicriteria traveling salesman problem for big enough input. In this case, a listening adversary computer, that is not equipped with these -or equivalent powerful resources, may need much more time to decrypt the secret.

Note that in the context of the invention, when reference is made to the fact that the receiver computer is equipped with computational resources stronger (or similar term) than the computational resources of an adversary computer, this may encompass one of many possible situations, for instance: (i) the adversary is equipped with weaker physical computational resources (e.g. smaller a nd/or slower memory, and/or slower processor, etc.) and is present throughout the entire session of transmitting information between the sender and the receiver, (ii) the adversary is present (namely can listen) in only portions the session (e.g. went down for a while due to malfunction) and therefore, even if equipped with equal or better physical resources compared to those of the receiver, it is inferior compared to the receiver insofar as the capability to decipher the secret and/or solving the computational tasks (iii) the physical computational resources of the adversary can be dynamically modified such that in certain duration(s) of the session they are weaker than those of the receiver and in certain other duration(s) they are stronger or equal to those of the receiver. An example is a dynamic allocation of processors in a multi-processor environment. Thus, for instance, if the adversary is physically equipped with n processors and the receiver with m m<n processors, and in certain duration(s) of the communication session, all the processors adversary are allocated for listening, naturally the receiver cannot obtain any gain. If, during certain other duration(s), i from among the n processors of the adversary are allocated to other tasks (where n−i<<m), then during this period, the adversary is inferior compared to the receiver. The net effect is that at the overall computational resources of the adversary may be weaker compared to that of the receiver.

Note that in certain embodiments, combination of (i) and (ii), or of (ii) and (iii) may apply. Note also that the specified options (i)-(iii) are provided by way of example only and are by no means binding.

Note also that in certain embodiments, there may be more than one adversary computer acting each in stand-alone mode, or in certain other embodiments, two or more of the adversary computers may conspire and share their resources in order to listen to the transmitted data. In the latter case, the conspiring adversaries are regarded as a single adversary, e.g. they combine their resource.

Note also that in certain embodiments, whilst the receiver has stronger computation resources than those of one or more adversary computers, there may be additional one or more adversary computers having identical or stronger resources than those of the receiver.

Note that for convenience of description, the various embodiments discussed herein refer to the presence of one or more adversary computers. Those versed in the art will readily appreciate that the invention is not bound by this stipulation.

In accordance with certain embodiments of the invention, irrespective of whether an adversary computer is present or not, the computational tasks are configurable, thereby affecting the intricacy of solving the tasks. By of non-limiting example, an input size of a particular problem is capable of being modified, e.g. longer inputs can result in a more intricate task. By way of another non-limiting example, choosing specific subsets of the possible instances may affect the intricacy of solving the task.

Bearing this in mind, attention is drawn to FIG. 1, illustrating a generalized block diagram 100, in accordance with an embodiment of the invention.

In FIG. 1, a receiver computer 101 has a fast, e.g. optical, device, or a computing system, that can perform a single combinatory task T in x time units. Although not shown, there may be additional receiver computers. Also shown an adversary computer 102 that employs weaker computational resources, e.g. it has a constant number k of slow computers that can jointly perform T in at least y>x time units. By one embodiment the computation of T is either by a single slow computer or by several computers, including the overhead of distributing the input and collecting output. The sender computer 103 transferred an encrypted secret to the receiver computer 101. Due to the stronger computational resources of the receiver computer 101, it can decrypt the encrypted secret considerably faster than the adversary computer.

In accordance with certain embodiments, the gap between the receiver and the adversary can be configurable, depending upon the particular application.

As will be exemplified below, a large variety of computational tasks can be employed. By way of non-limiting example, the operation of the system and method of the invention will be exemplified with reference to two variants of the so called lattice problem.

There follows now a description of using a succession of computational tasks (referred to occasionally also as problems) in accordance with certain embodiments using Worst Case Average Case Equivalent Lattice Problem (referred to occasionally also as hard lattice problem).

By these embodiments, the so called lattice shortest vector problem is used. Note that in the embodiment below, it is assumed that the computational resources of both the sender and receiver computers employ stronger resources than those employed by an adversary computer.

There follows now a brief overview of the lattice problem. As is well known, a lattice is a set of points in space such that every point is a combination $\Sigma_{i=1}^{l} a_i v_i$, where $a_i$ are integers and $v_i$, $1 \leq i \leq l$, are l independent vectors, each $v_i$ is of dimension (at least) l.

Finding the point of the lattice, that is not the origin, but is closest to the origin is called the (SVP) shortest vector problem (which is proved to be NP-hard for polynomial random reduction [2]).

An approximation problem is defined such that a solution for a randomly chosen instance of the approximation problem, implies a solution for the worst case instance of three famous worst-case problems related to the shortest vector problem of a lattice. The approximation problem is defined below (and it follows the known description of Ajtai's random lattice problem see, [1], [2], [3] and [6]).

For a given integer n choose $c_1$ and $c_2$ and compute $m = c_1 n \log n$ and $q = n^{c_2}$. $c_1$ and $c_2$ are chosen such that m and q are integers, and, (1) $c_2 \leq 7$ and, $$n \log q < m \leq \frac{q}{2n^4} \text{ and,} \qquad (2)$$

(3) $m < n^2$. (Note incidentally that given (1) and (3) above, it is obvious that $$m \leq \frac{q}{2n^4} \text{ for } n > 2.$$

Note that, say, $c_1 = 8$, $c_2 = 7$ and $n = 2^8$ satisfy the restrictions).

The input of the problem is a set of m vectors $\lambda=(v_1, v_2, \ldots, v_m)$ of length n and an integer q. The m−1 vectors $v_1, v_2, \ldots, v_{m-1}$ are chosen randomly from the set of all vectors $(x_1, x_2, \ldots, x_n)$, where $0 \le x_1 \le q-1$. Then m−1 values $\delta_1, \delta_2, \ldots, \delta_{m-1}$ are chosen randomly in $\{0,1\}$ and $v_m$ is computed to be $vm = -\Sigma_{i=1}^{m-1} \delta_i \cdot v_i \bmod q$.

A set $\Lambda(\lambda,q)$ is defined to be the set of all vectors $h=(h_1, h_2, \ldots, h_m)$ for which $\Sigma h_i \cdot v_i \equiv 0 \bmod q$. The length of a vector h is defined as the usual Euclidean norm $\|h\|=(h_1^2+h_2^2+\ldots+h_m^2)^{1/2}$. Given $\lambda,q$ as an input, the problem is to find a non zero vector h with length of at most n, $\|h\| \le n$. Note that by the construction of $v_m \Lambda(\lambda,q)$ includes a vector $h=(\delta_1, \delta_2, \ldots, \delta_{m-1}, 1)$ of length at most $(1^2+1^2+\ldots+1^2)^{1/2}=m^{1/2}$, which (by requirement 3 above) is no greater than $(n^2)^{1/2}=n$. In accordance with certain embodiments, the choices of, say m and/or q affect the size of the input of the task, and consequently may affect the intricacy of solving the task.

As specified above, in certain embodiments the computational tasks involve a harder problem. The harder problem requires that: (r1) the solution h is in the form of $h_i \in \{0,1\}^m$. This requirement further restricts the set of possible solutions, but includes at least the constructed solution. (r2) the solution h is the shortest non zero vector among all solutions that satisfy the requirements above, furthermore if there are several such shortest non zero vectors, then the solution is the vector h that is the smallest among them in a lexicographic order. The set of possible solutions is further restricted for the original approximation problem. Having a solution to the restricted version implies a solution to the original approximation problem, and therefore the new defined problem is at least as hard as the original approximation problem. The term shortest $01\lambda q$-vector is used for the problem that has just been defined.

Having described the mathematical background of the hard lattice problem, there follows a description with reference FIG. 2 illustrating a flow diagram of a sequence of operation performed at the sender computer and at a receiver computer, in accordance with an embodiment of the invention that utilize the hard lattice computation task. Thus, in lines 2 and 3 of the code, the sender chooses $n \ge 4$, $c_2 \ge 7$, and $c_1$ such that (m and q defined in lines 4 and 5 are integers and)

$$n \log n^{c_2} < c_1 n \log n \le \frac{n^{c_2}}{2n^4}.$$

Then in lines 4, 5 and 6 the sender computes $m=c_1 n \log n$ and $q=n^{c_2}$ and sends m and q to the receiver. In lines 7 and 8 the sender chooses m−1 random vectors $v_1, \ldots, v_{m-1}$ from the set of all vectors $(x_1, \ldots, x_n)$ with $0 \le x_i \le q-1$. In line 9 the sender chooses m−1 random values $\delta_1, \delta_2, \ldots, \delta_{m-1}$ such that $\delta_i \in \{1,0\}$. Then in line 10 the sender computes the vector $v_m = -\Sigma(\delta_i \cdot v_i) \bmod q$. The construction of $v_m$ and the inclusion of $v_m$ in the set of the vectors $v_1, v_2, \ldots, v_m$, ensures the existence of at least one (short) solution to the $01\lambda q$-vector problem and obviously assured solution to the shortest $01\lambda q$-vector problem. Namely, there is at least one vector $h=(\delta_1, \delta_2, \ldots, \delta_{m-1}, 1)$ such that $((\Sigma_{i=1}^{m-1}(\delta_i \cdot v_i))+v_m) \bmod q = (\Sigma_{i=1}^{m-1}(\delta_i \cdot v_i) - \Sigma_{i=1}^{m-1}(\delta_i \cdot v_i)) \bmod q \equiv 0$ and the length of h is $\|h\| \le \sqrt{m} \le n$. In line 11 the sender sends to the receiver the vectors $v_1, v_2, \ldots, v_m$ (which constitute the computational task that needs to be resolved).

Next, the sender repeatedly executes lines 13 to 21 until the file to be transferred is encoded. Thus, in line 13 the sender defines $\lambda$ as the set of vectors $(v_1, v_2, \ldots, v_m)$. In line 14 the sender finds the shortest $01\lambda q$-vector. Finding the shortest $01\lambda q$-vector may be performed by exhaustive search over the $2^m$ possible vectors $h=\delta^m=\{0,1\}^m$. For each such vector it is checked whether $\Sigma_{i=1}^m (\delta_i \cdot v_i) \bmod q \equiv 0$ (its length must be not greater than n) if so, h is included in the set S of possible solutions and compute the length of h. Then a vector from S with the shortest length among the vectors in S is chosen. In case there is a set of two or more vectors $T \subseteq S$ with the shortest length, then the first vector in T according to a lexicography order is chosen. Note that the construction of $v_m$ ensures that S is not empty, still the result of the above computation may be a vector h which is not the $\delta_1, \delta_2, \ldots, \delta_{m-1}, 1$ vector computed in lines 9 and 10. The first m−1 coordinates $h_1, h_2, \ldots, h_{m-1}$ of the shortest vector are used as a one time pad (OTP) for our encryption scheme.

Assume that the user would like to encrypt a secret, (the secret may be, e.g. in the form of a long file), there follows a description of the way consecutive portions of the secret file are encrypted and sent to the receiver. As will be explained in greater detail below, in accordance with the embodiment that is described with reference to FIG. 2, the secret portions are encrypted using solution of previously solved computational tasks. Thus, reverting to FIG. 2, in line 16 the sender computes the CipherText xoring (bitwise) the OTP and a portion of the Secret (that is of m−1 bits length). Then, in line 17, the sender sends the encrypted secret to the receiver. Note, incidentally, that in every iteration the sender first sends $\lambda$ (constituting the problem) and then the secret encrypted with the new obtained OTP. Similarly, the receiver first receives $\lambda$ and then decrypts the secret with the obtained OTP. In lines 18 and 19 (sender side) the process for the next m−1 bits of the secret file starts, i.e. choosing m−1 random vectors $(v_1, v_2, \ldots, v_{m-1}) \bmod q$ (as done in line 8), and new m−1 random values $\delta_1, \delta_2, \ldots, \delta_{m-1}$ (as done in line 9). In line 21 the sender computes the value of $v_m = -\Sigma(\delta_i \cdot v_i) \bmod q$ giving rise to the new problem. Then, the sender encrypts the new problem instance with the OTP portions (i.e. previous solutions) that were computed so far. More specifically, the sender sends to the receiver the vectors $((v_1, v_2, \ldots, v_m) \oplus \text{psuffix}(\text{OPTS}))$. The number of bits required to describe the matrix is $c_2 m \cdot n \cdot \log n$. A sequence of the OTP portions is used to encrypt the new instance of the problem defined by such a matrix.

In accordance with certain embodiments, the psuffix (OTPS) function that xores the OTPS portions that were computed most recently is used. Let $OTP_{k+1}, \ldots, OTP_{k+l}$ be the last l OTPS portions used in our algorithm, where $l \cdot (m-1) \ge c_2 m \cdot n \cdot \log n > (l-1) \cdot (m-1)$. Let $\text{mask}_{k+i} = \oplus_{j|(j \le k+l) \wedge (j \bmod (l+1)=i)} OTP_j$, $\text{psuffix}(\text{OTPS})=\text{pseudorandom}(OTP_{k+l}) \oplus \text{mask}_{k+1} \circ \text{mask}_{k+2} \circ \ldots \circ \text{mask}_{k+l}$. Note that in the beginning, the OTPS may have less than l OTP portion. In this temporary period, a pseudo random function with a seed obtained from all the OTP portions revealed so far is used. Note that here the seed $OTP_{k+}$ is defined, but other choices like a pseudo-random sequence defined by a seed that is a function of several previous OTPs may fit as well. In certain embodiments, in order to enlarge the fan-out of the problem, one would like to further restrict the choice of $(n, c_1$ and $c_2)$ q to ensure that $q=2^i$ for some integer i.

Having described a sequence of operations performed at the sender side for sending problems encrypted by previous solutions and secret portions encrypted by previous solutions, there follows now a description of the various operations performed by the receiver.

Thus, in line 2 the receiver receives the values m and q. In line 3 the receiver receives the first $v_1, v_2, \ldots, v_m$ (constituting the problem). Then the receiver repeatedly executes lines 5 to 10 until the receiver receives the entire secret file. More specifically, in line 5, $\lambda$ is used to denote the set of vectors $(v_1,$ $v_2, \ldots, v_m$) that define the next problem instance. In line 6 the receiver finds the shortest $01\lambda q$-vector (denoted OTP), i.e. the solution. In this connection it may be recalled that the receiver computer is equipped with stronger resources than a listener and accordingly the time required for the receiver to solve the problem and to arrive to the specified shortest $01\lambda q$-vector is considerably shorter than the time that would have taken to the adversary computer to solve the same problem.

Then in line 8 the receiver receives the CipherText (which as may be recalled is the secret portion encrypted by the previous solutions—see steps 16 and 17 at the sender end). Reverting to the receiver, in step 9, the secret (portion) is decoded by xoring the computed shortest $01\lambda q$-vector (obtained step 6,7) as the one time pad (OTP) for the received CipherText. At last the receiver receives the new vectors $((v_1, v_2, \ldots, v_m) \oplus \text{psuffix}(OTPS))$, indicating the new problem encrypted using previous solutions. Thus, the results of previous iterations (namely using the previous solutions) allow the receiver to compute the problem instance $v_1, v_2, \ldots, v_m$ for the next iteration. The procedure (steps 4 to 11) is repeated until all secret portions are revealed constituting the entire secret.

In the description above, a specific sequence of operations performed at the sender and the receiver side has been described with reference to FIG. 2. In this context, note that, due to the enhanced (referred to occasionally also as stronger) computational resources of the receiver computer compared to those of the adversary computer, there exists an inherent time difference between the respective durations that it is required for the receiver computer and the adversary computer to resolve a given problem and thereby revealing the secret portion that was encrypted by the solution of the specified problem (see, e.g. steps 7 to 9 of FIG. 2 performed at the receiver end). This time gap increases over time as more problems need to be resolved for revealing the entire secret.

It should be further noted that in the specified embodiments described above (with reference to FIG. 2), a hard version of the lattice problem has been used. Moreover, it was assumed that both the sender and the receiver employ stronger computational resources than a listening adversary. The invention is of course not bound by these examples.

In addition, in the specified embodiments, some specific implementations are utilized. For instance, the encryption technique that is used to mask the secret is Xor based function. In the specified embodiments, the secret is composed of secret portions each encrypted by the sender using a solution of the previous problem. In the specified embodiments, the solution of the previous problems is used to encrypt the next problem. All the specified limitations are by no means binding. For instance, in accordance with certain embodiments, an encryption function other than Xor based function can be used. By way of another example, in accordance with certain embodiments, only selected portion(s) of the secret may be encrypted using selected one or more solutions of previous computational tasks. In accordance with certain embodiments, none or only certain problems are encrypted using previous one or more solutions.

Note that solution(s) may be used directly or indirectly for encrypting one or more problem portion(s) and/or secret(s) portion. Thus, by way of example, indirect use of solution(s) being using a function that is dependent upon at least some of the solution(s).

In the embodiments described above with reference to FIG. 2, both the receiver and the sender had stronger computational resources than those of the adversary. Turning now to certain other embodiments of the invention, they concern the case in which the receiver(s) have to use extensive computing power.

In other words, the gap in the computation power used is only the gap between the receiver and the listening adversary, while the sender does not have to (or is not able to) perform computation expensive process. In accordance with these embodiments, it is assumed that the probability for having a large number of solutions to the short $01\lambda q$-vector problem (discussed with reference to FIG. 2, above) is very small, and the fact that it is possible to notify the receiver with the OTP path. The short $01\lambda q$-vectors problem is defined similarly to the definition of the shortest $01\lambda q$-vector discussed above, however, it is harder in the sense that it has to return the set that consists of all the solutions $h=(\delta_1, \delta_2, \ldots, \delta_{m-1}, 1) \in \{0,1\}^{m-1} 1$, such that $((\Sigma_{i=1}^{m-1}(\delta_i \cdot v_i)) + v_m) \bmod q \equiv 0$.

In this scheme the sender does not have to compute the solution of the short $01\lambda q$-vector. The sender builds the random instances $(v_1, v_2, \ldots, v_m)$ (constituting the problem) as described above (see steps 7 to 10 in FIG. 2). It is important to note that by the construction of the problem, there is a built-in solution for the short $01\lambda q$-vector. The built-in (referred to also as constructed) solution is the sequence $\delta_1, \ldots, \delta_{m-1}$ calculated at the sender side (see steps 9 and 10 at the sender side in FIG. 2). Note that there may be additional solutions for the same problem (i.e. a different sequence of $\delta_1, \ldots \delta_{m-1}$, however, the sender computer is devoid of sufficient computational resource to calculate relatively fast the other solutions.

Bearing this in mind, the sender sends the so-calculated problem masked by the psuffix function defined over the last lsequences of the OTP, where the OTP is the constructed solutions of the short $01\lambda q$-vector: $(\delta_1, \ldots, \delta_{m-1})$.

The operational stages at the receiver side, will be described with reference also to FIG. 2. Thus, the receiver finds more than one possible solution, if exists, (including the specified constructed by the sender). More specifically, the receiver (which as recalled. is equipped with strong computational resources), will calculate rapidly all the short $01\lambda q$-vectors that constitute valid solutions for the sent problem. One of the calculated solutions is the specified constructed solution, however, the receiver computer does not know which from among the solutions is the constructed solution. As may also be recalled, the problem is so generated such that there are only few and not so many solutions. So, how will the receiver know which is the constructed solution?

Figure 3:
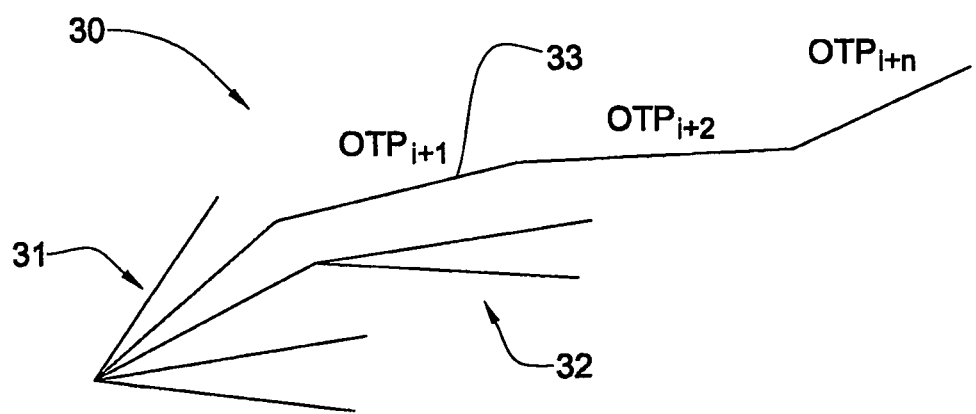
FIG. 3 illustrates a computational tree used in certain embodiments of the invention.

In accordance with certain embodiments, the receiver will use a computation tree 30, the computation tree represents the set of all the possible solutions and the problems they define. In the example of FIG. 3, there are 5 solutions for the first problem (see the five branches 31). When the receiver receives the next instances masked by the constructed solution (same as step 10 at the receiver end in FIG. 2), the receiver needs to decipher the new problem using solution of the previous problem (being the constructive solution). However, the receiver has five possible solutions and he/she does not know which from among the five is the constructive solution that was used to encrypt the problem. Thus, the receiver is compelled to try and decrypt the new problem using each of the previous possible solutions (i.e. in the latter example each of the specified 5 solutions). Each such possible solution will result in a different instance of the short $01\lambda q$-vector problem, giving rise to 5 new problems, all of which appear on its face to be valid, notwithstanding that fact that only one of them is the problem generated and transmitted to the receiver. Having constructed the five problems, the receiver attempts to solve each one of them, i.e. to arrive to all possible short $01\lambda q$-vectors. As shown in FIG. 3, three out of the five branches are truncated, meaning that the receiver could not find even a single solution for the specified problems. The conclusion is thus that these three problems are invalid and therefore are discarded. The receiver could find two short 01λq-vectors for one problem (32) and one short 01λq-vector for the other problem (33).

How the receiver will eventually know which from among the two problems is the valid one (generate by the sender). This is achieved using a synchronization phase. Thus, the sender uses $(\delta_1, \ldots, \delta_{m-1})$ (i.e. the constructed solution) as the OTP (the OTP may not include $\delta_m$ since it is always 1). Once every k iterations (k selected), the sender will make one or more synchronization phases with the receiver by sending the constructed solution (similar to line 20 of FIG. 2) possibly together with the encrypted new problem $((v_1, v_2, \ldots, v_m) \oplus \text{psuffix}(\text{OTPS}))$ (as computed for instance in line 22 of FIG. 2). In other words, the sender sends $(\delta_1, \ldots, \delta_{m-1})$—the constructed solution as well as the new encrypted problem $((v_1, v_2, \ldots, v_m) \oplus \text{psuffix}(\text{OTPS}))$. The synchronization phase does not produce a new element for computing psuffix (OTPS) nor used for encryption. The receiver will have a very high probability to truncate all the possible computations but one. In the example of FIG. 3, the sender sends the OTP suggesting the receiver that solution 33 is valid. From here onwards, the receiver will continue to develop the tree from branch 33 whilst discarding branch 32. Obviously the sender may wait a few more iterations before sending the synchronizing solution, in other words k is configurable. Note that due to the fact that there are only few possible solutions for every problem, every node of the tree is bound by only few braches and therefore the tree will not blow up even if the receiver needs to maintain a few levels of the tree before a synchronizing phase is invoked.

In accordance with certain embodiments, there exist q, n, m, k, and l, for which the expected number of iterations to reveal the i iteration secret is less than the i+k iteration.

The short 01λq-vector can be viewed as a set of n randomly chosen sums, these suims should be 0 modulo q. In more details, summing the $x_j$ coordinates, as defined in line 19 of FIG. 2 of all $v_i$ for which $\delta_i=1$ or i=m should result in a number that is 0 modulo q. For every equation among these n equations and for every given $\delta_1, \delta_2, \ldots, \delta_{m-1}$, 1 the probability that its sum is 0 modulo q is $$\frac{1}{q^n}.$$

Therefore, the probability that a binary vector of dimension m−1 is a solution for the n equations is $$\frac{1}{q^n}.$$

The expected number of solutions (without the constructed solution) in a particular iteration is $(2^{m-1}-2)/q^n$.

The expected number of extra computations (computations that are beyond the computation on the OTP path represented by tree nodes not on the OTP path in FIG. 3 before the k'th (synchronization) iteration, is therefore, $(((2^{m-1}-1)/q^n)^k-1)/((2^{m-1}-1)/q^n)-1)$.

The probability that the l synchronization phases starting in the $k^{th}$ iteration will result in valid solutions is $1/q^{ln}$, thus the expected number of possible computations following the synchronization phase is less than $(((2^{m-1}-1)/q^n)^k-1)/(((2^{m-1}-1/q^n)-1)(q^{ln}))$.

Choosing n=37, $c_2>7$, k=2 and l=1, we have m=1350 and $q=n^7+1=94931877134$. Thus, the inequality $n\log q<m<n^2$ and $m<q/2n^4$ yields 1349<1350<1369 and 1350<25326.

The above choice yields $(2^{m-1}-1)/q^n=(2^{1349}-1)/(37^7+1)^{37}<0.85$, and therefore the expected number of extra computations before the synchronization phases is bounded by: $(0.85^k-1)/((0.85-1)(37^7+1)^{37})$. For say, k=2 we have that the expected number of computations beyond the chosen computations following the synchronization is negligible.

Note that due to the enhanced computational resources of the receiver computer compared to those of the adversary computer, there exists an inherent time difference between the respective durations that it is required for the receiver computer and the adversary computer to resolve a given problem and thereby revealing the secret portion that was encrypted by the solution of the specified problem (see, e.g.—see steps 7 to 9 in FIG. 2 performed at the receiver end). This time gap increases over time as more problems need to be resolved for revealing the entire secret.

In addition, in the specified embodiments some specific implementations are utilized. For instance, the encryption technique that is used to mask the secret is Xor based function. In the specified embodiments, the secret is composed of secret portions each encrypted by the sender using a solution of the previous problem. In the specified embodiments, the solution of the previous problems is used to encrypt the next problem. All the specified limitations are by no means binding. For instance, in accordance with certain embodiments, an encryption function other than Xor based function can be used. By way of another example, in accordance with certain embodiments, only selected portion(s) of the secret may be encrypted using selected one or more solutions of previous computational tasks. In accordance with certain embodiments, none or only certain problems are encrypted using previous one or more solutions.

Note that solution(s) may be used directly or indirectly for encrypting one or more problem portion(s) and/or secret(s) portion. Thus, by way of example, indirect use of solution(s) being using a function that is dependent upon at least some of the solution(s).

Note also that for maintaining the set of possible solution a computational tree has been employed. The invention is, of course, not bound by this implementation and other variants can be used.

It should be further noted that in the example above, a receiver computer with stronger computation resources and a sender with weaker computation resources has been used. This, however, is not binding. Thus, in accordance with certain other embodiments, stronger resources are employed by both the sender and the receiver similar to the embodiment described with reference to FIG. 2 above.

In the embodiments described above, the computation tasks involved the use of the hard lattice problem (described with reference to FIG. 2) and in accordance with certain other embodiments, a conventional lattice problem has been used. Note that the invention is not bound by using computation tasks that are bound by these variants of the lattice problem. Moreover, other examples of computation tasks may be employed, e.g., Multicriteria TSP, or Number of TSP Solutions.

The invention is not bound by these examples. Thus, in accordance with certain other embodiments, a computation problem that falls in the category of the so called NP hard problems can be used, or in accordance with certain embodiments other hard problem(s) of any desired complexity class can be used.

Note that the invention is not bound by the use of a single type of computation task. Thus, for example, in accordance with certain embodiments, a hybrid of computation tasks involving two or more distinct computation task types may be used (e.g. hard lattice problem and Multicriteria TSP). The decision which problem to use and for how long may be determined e.g. judicially (e.g. changed every T time units, or every i instances of the problem, etc.) or selected arbitrarily.

Note also that, whereas the description above referred for convenience only to one directional communication, the invention is by no means bound by this example and bi-direction communication is also applicable.

The enhancement of computational gaps discussed above with reference to non-limiting embodiments, may be utilized in various applications.

Thus, in accordance with certain embodiments, one or more of the solutions may constitute a basis for generating an encryption/decryption keys. Thus, for example, the specified solution/solutions may serve as a pseudo random generator for generating private/public keys. After having generated the keys, the parties can communicate in one or bi direction communication using known per se encryption communication schemes. Note that this application can be employed regardless of whether the sender computer is stronger (than the adversary computer) or not.

Note also that the various embodiments described above are applicable for various applications, where anonymity of the receiver is maintained. Examples are anonymous television subscribers.

In accordance with certain embodiments of the invention, encrypted end-to-end and broadcast for unidirected network is achieved. Thus, the sender can send a message to be forwarded to a remote receiver such that the message is transmitted over each hop in the path using the specified scheme for unidirectional delivery. An intermediate hop may act only as a relay, namely simply forwarding the encrypted message. This would be applicable, for instance, to intermediate computers with insufficient resources to solve the computational tasks in the manner described above. Alternatively, the intermediate node(s) may be adapted to decrypt messages and encrypt them again in accordance with the teachings of various embodiments of the invention described above. The intermediate nodes in the network may be formed of the former type of nodes, or in accordance with certain other embodiments of the latter type, or in accordance with certain other embodiments of hybrid of both types.

Broadcast schemes may use the specified option resulting in decryption of the message by all nodes with superior computing capabilities over the listening adversary (whether it listens to the transmission over the links, or it is in the form of a computation weak node). One possible implementation is, for example, satellite television broadcasters that would not like to update the satellite with every new subscriber.

In accordance with certain embodiments, the scheme of the invention can be used for Combating spam (junk mail). By this particular embodiment, the email-sender will act as the receiver of the scheme, and the email-receiver will act as the sender of the scheme. In this way the email-receiver will not have to compute the solution for the problem. More specifically, the email-sender sends a request for delivery, receives problems to solve (up to the first synchronization phase), then solves them and sends the email with the solution, the email-receiver will check the solutions and only when it is correct will process the message.

In accordance with certain other embodiments, the scheme according to the invention, can be used for resource allocation, e.g. for controlling access to a shared resource. Thus, in order to access a resource, one will need to solve a problem supplied, say by the resource administrator. For instance, the service provider may decide to support only clients having computational resources that exceed a given threshold. To this end, the hardness of the computational tasks can be configured, such that the harder the computational tasks, the stronger the computational resources that the client should be equipped with in order to be able to access the service.

In accordance with certain other embodiments, some of the specified implementations can be used in scenarios where a user that is equipped with a weak computational device would like to transmit, say, his/hers current location/ other data (such as state) to a computationally strong base station without letting the adversary reveal the secret.

Figure 4:
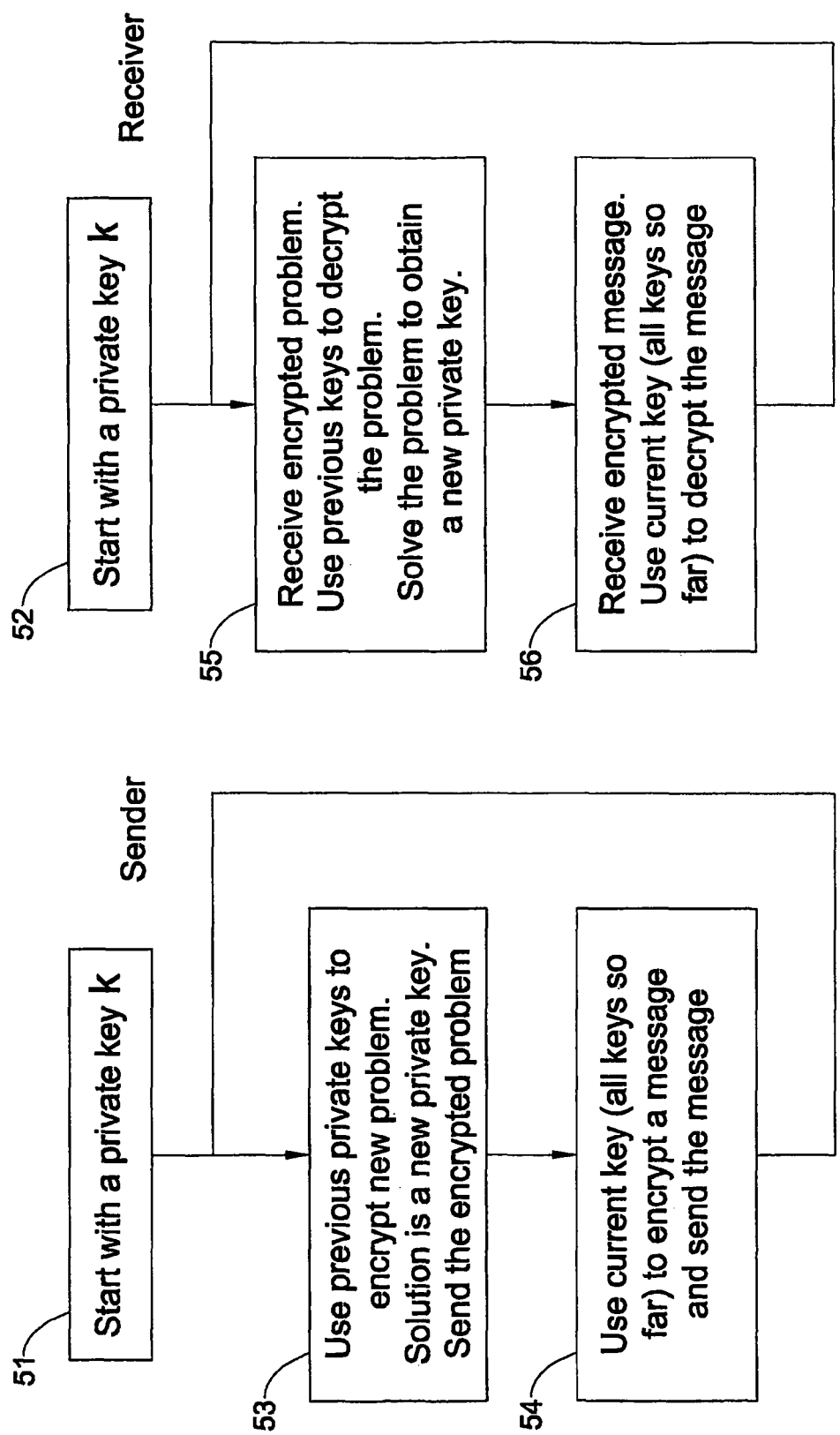
FIG. 4 illustrates a flow diagram of an application that utilizes the method in accordance with certain embodiments of the invention.

In accordance with certain embodiments of the invention, the scheme, in accordance with the invention, can be used to enhance safety of encryption keys, which forms in fact a proactive security scheme. This embodiment will be described with reference also to FIG. 4. Thus, at the onset the sender and the receiver exchange data using key k (51 and 52). Using the same key may degrade the level of security since, for instance, if the keys are based on pseudo-random generated seed, an adversary may reveal the secret after it has been used for a while. Bearing this in mind, the scheme, in accordance with certain embodiments of the invention, can be used to enhance the safety by using the previous key or keys to encrypt a problem generated at the sender end 53 (in the manner described above with respect to various embodiments of the invention). The previous solutions of the problems and the first key define a new key and are used to encrypt the new message transmitted to the receiver 54. The receiver will use the current key (or also previous keys) to decrypt the problem and to solve it and thereby obtain the new key 55. The new key can serve for decrypting messages transmitted by the sender 56. Note that the sender will synchronize and transmit new problem and use the solution thereto as the new key for exchange messages between the sender and receiver, by repeating the specified steps 53, 54 at the sender end and 55, 56 at the receiver end. As before, the computational gap between the receiver and the adversary is increased over time. Note that the more frequent of changing the keys, the stronger is the scheme.

As specified above, the computational gap between the receiver and adversary, gives rise to time delay between the timing that the receiver solves a problem (and/or decipher the secret) and the timing that the adversary accomplishes the same task. Thus, in accordance with certain embodiments, this time delay can be controlled using selected factor. One such factor is the resources difference, such that the stronger the resources, the larger the gap, e.g. using stronger and/or more processors, larger/faster memory, etc. Another example of a factor is the type of the computation task such that harder problem imposes longer delay. Other non-limiting example that affects the delay is the number and type of problems. For instance, the first X (X configurable) problems constitute "noise", serving just to increase the delay between the-receiver and the adversary. Encryption starts only from the $(X)+1^{th}$ problem.

It will also be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following claims:

The invention claimed is:

1. In a communication system that includes a sender computer and at least one designated receiver computer coupled to the sender through a communication link, each one of the at least one designated receiver computer is equipped with computational resources stronger than computational resources of an adversary computer, the stronger computational resources including at least one of processor memory and communication, a method for encrypting a secret and sending the encrypted secret from the sender computer to the at least one designated receiver computer, the secret including a plurality of secret portions, the method comprising:
   a) the sender computer defining at least one computational task having respective solutions; the at least one computational task is so defined such that the duration of solving said at least one computational task by each one of said at least one designated receiver computer is configured to be shorter than what would have been required for the adversary computer to solve the at least one computational task;
   for each secret portion of the secret, consecutively,
   b) the sender computer:
      (i) encrypting said secret portion by using at least one solution of a task from among said at least one computational task; and
      (ii) sending through the communication link publicly said at task and said encrypted secret portion, wherein said publicly sent task except for a first publicly sent task is encrypted by using at least one solution of at least one previously publicly sent task;
   c) each one of the at least one designated receiver computer receiving said publicly sent task and decrypting said encrypted secret portion faster than what would have been required for the adversary computer to decrypt the encrypted secret portion,
   wherein said faster decrypting includes solving the publicly sent task faster than what would have been required for the adversary computer to solve the publicly sent task only due to said stronger computational resources,
   repeating said b) and c) until all encrypted secret portions are sent by the sender computer and decrypted by the at least one designated receiver computer, constituting the secret.

2. The method according to claim 1, wherein said encrypted secret portion being a function of a solution of the last computational task in said publicly sent task.

3. The method according to any one of the preceding Claims, wherein said secret is at least one or a combination of text data, audio data and video data.

4. The method according to claim 1, wherein said communication link is wireless.

5. The method according to claim 1, wherein said communication link is wired.

6. The method according to claim 1, wherein said at least one computational task is a lattice problem.

7. The method according to claim 1, wherein said at least one computational task is a hard lattice problem.

8. The method according to claim 1, wherein said at least one computational task is a Multicriteria TSP.

9. The method according to claim 1, wherein said at least one computational task is Number of TSP Solutions.

10. The method according to claim 1, wherein said at least one computational task is a hard problem of selected complexity class.

11. The method according to claim 1, wherein the sender computer is equipped with computational resources stronger than computational resources of an adversary computer.

12. The method according to claim 1, wherein the sender computer is equipped with computational resources identical or weaker to the computational resources of an adversary computer.

13. The method according to claim 1, wherein communication between the sender computer and at least one designated receiver computer through said communication link is one directional.

14. The method according to claim 1, wherein communication between the sender computer and at least one designated receiver computer through said communication link is bi-directional.

15. The method according to claim 1, wherein one or more of the respective solutions constitutes a basis for generating an encryption/decryption key.

16. The method according to claim 15, wherein said encryption/decryption key is a private public pair of keys.

17. The method according to claim 1, further comprising maintaining anonymity of the at least one designated receiver computer.

18. The method according to claim 1, wherein at least one of said computational tasks is configurable.

19. In a communication system that includes a sender computer and at least one designated receiver computer coupled to the sender through a communication link, each one of the at least one designated receiver computer is equipped with computational resources stronger than computational resources of an adversary computer, the stronger computational resources including at least one of processor memory and communication, a method for encrypting a secret and sending the encrypted secret from a sender computer to the at least one designated receiver computer, the secret including a plurality of secret portions, the method comprising:
   a) the sender computer defining at least one computational task having respective solutions;
   for each secret portion of the secret, consecutively,
   b) the sender computer:
      (i) encrypting said secret portion by using at least one solution of a task from among said at least one computational task; and
      (ii) sending through the communication link publicly said task and said encrypted secret portion, wherein said publicly sent task except for a first publicly sent task is encrypted by using at least one solution of at least one previously publicly sent task;
   c) each one of the at least one designated receiver computer:
      (i) receiving said publicly sent task;
      (ii) solving said publicly sent task; and
      (iii) decrypting said encrypted secret portion,
   wherein a gap between an amount of information decrypted by the at least one designated receiver computer by solving said publicly sent task and an amount of information decrypted by the adversary computer by solving said publicly sent task grows over time only due to said stronger computational resources;
   repeating said b) and c) until all encrypted secret portions are sent by the sender computer and decrypted by the at least one designated receiver computer, constituting the secret.

20. In a communication system that is configured to include a sender computer and at least one designated receiver computer connectable to the sender through a communication link, each one of the at least one designated receiver computer is capable of being equipped with computational resources stronger than computational resources of an adversary computer, the stronger computational resources including at least one of processor memory and communication, a method for encrypting a secret and sending the encrypted secret from the sender computer to the at least one designated receiver computer, the secret including a plurality of secret portions, the method comprising:

a) the sender computer defining at least one computational task having respective solutions; the at least one computational task is so defined such that the duration of solving the at least one computational task by each one of said at least one designated receiver computer is configured to be shorter than what would have been required for the adversary computer to solve the at least one computational task;

for each secret portion of the secret, consecutively, b) the sender computer:
  (i) encrypting said secret portion by using at least one solution of a task from among said at least one computational task; and
  (ii) sending through the communication link publicly said task and said encrypted secret portion, wherein said publicly sent task except for a first publicly sent task is encrypted by using at least one solution of at least one previously publicly sent task;

such that each one of the at least one designated receiver computer that is capable of receiving said publicly sent task is capable of decrypting said encrypted secret portion faster than what would have been required for the adversary computer to decrypt the encrypted secret portion; and wherein said faster decrypting includes solving the publicly sent task faster than what would have been required for the adversary computer to solve the publicly sent task only due to said stronger computational resources, repeating said b) until all encrypted secret portions are sent by the sender computer and decrypted by the at least one designated receiver computer, constituting the secret.

21. A non-transitory carrier storing computer code portions for implementing the method of claim 20.

22. In a communication system that is configured to include a sender computer and at least one designated receiver computer connectable to the sender through a communication link, each one of the at least one designated receiver computer is capable of being equipped with computational resources stronger than computational resources of an adversary computer, the stronger computational resources including at least one of processor memory and communication, a method for receiving an encrypted secret from the sender computer by a designated receiver computer, the encrypted secret including a plurality of encrypted secret portions being encrypted from respective secret portions of a secret, the method comprising:

for each encrypted portion of the plurality of encrypted secret portions, consecutively, a) the at least one designated receiver computer receiving through said communication link a publicly sent task and the encrypted secret portion; the publicly sent task being selected among at least one computational task that is so defined to have respective solutions;

b) each one of the at least one designated receiver computer is configured to solve the publicly sent task in a shorter duration than what would have been required for the adversary computer to solve the publicly sent task; whereby the encrypted secret portion being a function of at least one respective solution of a task from among said at least one computational task;

c) the at least one designated receiver computer is capable of decrypting said encrypted secret portion faster than what would have been required for the adversary computer to decrypt the encrypted secret portion; and wherein said faster decrypting includes solving the publicly sent task faster than what would have been required for the adversary computer to solve the publicly sent task only due to the stronger computational resources including at least one of processor memory and communication, repeating said a)-c) until all encrypted secret portions of the encrypted secret are decrypted by the at least one designated receiver computer, constituting the secret.

23. A non-transitory carrier storing computer code portions for implementing the method of claim 22.

* * * * *